United States Patent [19]
Keblys et al.

[11] 4,131,645
[45] Dec. 26, 1978

[54] IODINE RECOVERY PROCESS

[75] Inventors: Kestutis A. Keblys, Southfield; John M. McEven, Lake Orion, both of Mich.

[73] Assignee: Ethyl Corporation, Richmond, Va.

[21] Appl. No.: 525,870

[22] Filed: Nov. 21, 1974

[51] Int. Cl.$^2$ .............................................. C01B 7/14
[52] U.S. Cl. ..................................... 423/501; 210/32
[58] Field of Search ...................... 423/501, 500, 503; 210/24, 30, 30 R, 32

[56] References Cited

U.S. PATENT DOCUMENTS 3,352,641  11/1967  Nakamura .................. 423/501 O R

FOREIGN PATENT DOCUMENTS 52-1511   5/1952  Japan ........................................ 423/501
52-4464  10/1952  Japan ........................................ 423/501

Primary Examiner—L. Dewayne Rutledge
Assistant Examiner—Michael L. Lewis
Attorney, Agent, or Firm—Donald L. Johnson; Robert A. Linn; Joseph D. Odenweller

[57] ABSTRACT

Iodine is recovered from an aqueous solution containing iodide such as underground brine by repeated cycles of (1) passing the brine through a basic anion exchange resin to adsorb iodide, and (2) oxidizing adsorbed iodide to iodine by passing an acidified aqueous iodate solution (e.g., $NaIO_3$) through the resin. The cycle is repeated many times until the resin is iodine-loaded. Iodine is then eluted from the resin, for example, with aqueous NaOH and recovered from the eluate by conventional means.

7 Claims, No Drawings

IODINE RECOVERY PROCESS

BACKGROUND

Extraction of iodine from aqueous iodide solutions using anion exchange resins is known. Jap. 52/4464 describes such a process in which underground brine water containing iodide is acidified with $H_2SO_4$ and chlorinated to liberate iodine. The oxidized brine is passed through a strongly basic anion exchange resin which adsorbs the iodine. Iodine is eluted from the resin with an aqueous caustic sodium sulfite solution. Iodine is recovered from the eluate by acidification and oxidation with chlorine. Residual iodide is eluted from the resin using an aqueous alkali chloride or sulfate.

Jap. 52/1511 describes another suitable method in which brine containing iodide is passed through a highly basic anion exchange resin in chloride form to adsorb iodide. Following this, the iodide is oxidized on the resin to iodine by passing aqueous ferric chloride or hydrogen peroxide through the resin. This procedure is repeated many times until the Jap. 59/9258 describes a process in which alkaline brine is aerated to adjust pH to 7-9 and then oxidized with chlorine to liberate iodine. The oxidized brine is then passed through a strongly basic anion exchange resin to adsorb iodine.

Jap. 70/31842 describes a process in which chlorine water is added to alkaline brine containing iodide ion and the resulting solution passed through a strongly basic anion exchange resin to adsorb iodine and iodide.

Nakamura et al, U.S. 3,346,331, describe the adsorption of iodine on an anion exchange resin by chlorinating a portion of natural gas well water containing iodide and alternating passage of chlorinated and unchlorinated well water through the anion exchange resin to load the resin with iodine.

SUMMARY

According to the present process, iodine is recovered from brine containing recoverable amounts of iodide by adsorbing the iodide on a basic anion exchange resin and oxidizing the adsorbed iodide to iodine by passing an acidified aqueous iodate solution through the resin. This cycle is repeated until the resin bed is "loaded". By "loaded" is meant that the resin's capacity for retaining iodine values has been substantially reached, which is evidenced by iodine leaking through the resin.

Iodine is eluted from the loaded resin by conventional methods such as by elution with aqueous NaOH. Iodine is recovered from the caustic eluate by conventional methods such as acidification and chlorination of iodide to iodine, which precipitates and can be filtered off.

DESCRIPTION OF THE PREFERRED EMBODIMENTS

A preferred embodiment of the present invention is a process for recovering iodine from water containing recoverable amounts of iodine, generally in the form of iodide such as is present in certain underground brine. In this process the brine is passed through a basic anion exchange resin such as a quaternary ammonium resin to adsorb the iodide content of the brine. The capacity for adsorbing iodide in such resins is limited by the number of exchangeable anions. When the resin becomes substantially saturated with iodide, as shown by iodide leakage through the resin, an acidified aqueous iodate solution such as acidified aqueous sodium iodate is then passed through the resin to oxidize the adsorbed iodide to iodine. This regenerates the ability of the resin to adsorb additional iodide because such resins can retain many times as much iodine as they can iodide.

The cycle of passing brine followed by iodate oxidation is repeated through many cycles until the resin becomes loaded with iodine and unable to retain any further iodine. The iodine is then eluted from the resin by any of the known iodine-elution methods. This is most preferably accomplished by passing aqueous caustic (NaOH) through the column, which removes the iodine from the column in the form of iodide and iodate anions.

Iodine is recovered from the eluate by conventional means such as by acidifying the eluate and chlorinating it to liberate the iodine in elemental form. It can then be recovered by filtration.

As stated above, the various steps in the overall process are known in the art except for the use of acidified aqueous iodate solution to oxidize iodide to iodine on the resin. Thus, the invention can be stated as an improvement in the process for recovering iodine from underground brine containing recoverable amounts of iodine in the form of iodide by passing the brine through a basic anion exchange resin to adsorb iodide anion and then oxidizing the adsorbed iodide anion to iodine. The passing of brine through the resin and oxidizing of adsorbed iodide to iodine is repeated through many cycles until the resin becomes substantially loaded with iodine, which is recovered from the resin by conventional methods such as by aqueous caustic elution. According to the improvement, the oxidation of the adsorbed iodide to iodine on the resin is accomplished by passing an acidified aqueous iodate solution through the resin to convert adsorbed iodide to adsorbed iodine.

The improved process offers many advantages over known procedures. It uses much less acid than the method in which the total brine is acidified and chlorinated prior to passage through the anion exchange resin. The use of the iodate oxidant is far superior to the use of other oxidants for oxidizing iodide on the resin. For example, when ferric chloride is used the resin bed tends to become plugged due to precipitation of iron compounds. These are believed to be iron hydroxide or iron bicarbonate, which are precipitated when unacidified brine is passed through a resin bed that has been oxidized by ferric chloride solution.

The improved method is also superior to the use of chlorine or chlorine water to oxidize iodide ion on the resin. When used in this manner chlorine tends to overoxidize iodide to iodate which is not retained and moves down the resin. This iodate can again oxidize iodide to iodine but the net result of this over-oxidation is that the iodine values in the column migrate down the column during the passage of chlorine water and some is lost in the eluate.

The process can be used to recover iodine values from any aqueous solution containing iodide in recoverable amounts. This amount depends upon economics. In general, amounts of about 50 parts per million (ppm) or more are considered economically recoverable, although even lower amounts can be considered recoverable under proper economic conditions. Preferably the process is used to recover iodine from underground brine containing at least 50 ppm of iodide. There is no real upper limit, but brines containing up to about 500 ppm iodide or even higher can be beneficially used.

Ion exchange resins useful in the process are the basic anion exchange resins. These resins have amine or quaternary ammonium sites on the resin backbone which is generally of a polystyrene type. The more preferred resins are the strongly basic anion exchange resins such as those having a quaternary ammonium site, for example, polystyrene trimethylammonium chloride resins. A useful resin of this type is Amberlite 400 (trademark of Rohm and Haas Company).

It is generally preferred to filter the brine prior to passing it through the bed to prevent foreign material from entering the resin bed.

The pH of the underground brine normally ranges from about 5 to about 8.5. It is not necessary to neutralize or acidify such brines when using strongly basic resins. The brine is merely passed through a column containing the resin.

The flow rate of brine through the resin is not critical. Flow rates are generally expressed in terms of gallons per minute per square foot of resin bed cross-section. A useful flow rate is about 1 to 20 gal/min/ft$^2$.

The brine is usually passed through the resin at ambient temperatures. Higher temperatures can be used as long as they are not so high that they damage the resin. A useful temperature range is about 10 to 70° C., preferably 20°–50° C.

The resin bed adsorbs the iodide from the brine exchanging it for the original anion, which is generally chloride. Brine passage is continued until iodide begins to break through the resin and is detected in sharply increasing amounts in the effluent. Brine circulation is then stopped because the resin's capacity for iodide has been reached. At this point the bed does not contain enough iodide to make it economical to extract it from the bed. Such resin beds have much higher capacities for iodine in elemental or zero valent form.

The iodide in the bed is then oxidized to iodine according to the present invention using as the oxidant an acidified aqueous iodate salt solution. Ammonium or water-soluble metal iodates can be used. These are preferably alkali metal iodates, for example, sodium iodate, potassium iodate, lithium iodate, cesium iodate, and the like. Sodium iodate is most preferred.

The concentration of the iodate salt solution can vary. Good results are obtained using iodate salt solutions (e.g., sodium iodate) containing about 0.02 to 10 weight percent iodate salt.

The iodate solutions are acidified prior to passing them through the resin column. Preferably strong mineral acids are used such as hydrochloric, sulfuric, phosphoric, and the like. The preferred acid is HCl. The amount of acid should be sufficient to lower the pH to a range of about 1–4, and more preferably 1–3.

Iodate oxidizes iodide to iodine according to the following equation:

$$5\,I^- + IO_3^- + 6H^+ \rightarrow 3\,I_2 + 3H_2O$$

From this, it can be seen that the amount of iodate solution used in each oxidation cycle should be an amount which contains at least about 0.2 mole of iodate per mole of iodide adsorbed. This is the theoretical amount. Preferably the iodate solution contains a slight excess of iodate in the range of about 1.01–1.05 theories.

The amount of acid required to acidify the iodate solution used in each oxidation cycle according to the above equation is 1.2 equivalents or protons per equivalent of iodide adsorbed. This amount is one theory. Preferably an excess of acid is used. A useful range is from 1.1–1.5 theories. A preferred range is 1.15–1.3 theories, and a most preferred amount is about 1.2 theories.

When the iodate salt is sodium iodate and the acid is HCl good results have been obtained using a solution which contains at least 1.1 part by weight HCl per part by weight of sodium iodate. A useful range of HCl in such solutions is about 1.1–1.25 parts by weight HCl per part by weight sodium iodate.

The rate at which iodate solution is passed through the resin is not critical. Good results can be obtained if rates range from about 0.1 to 6 gal/min/ft$^2$. Likewise, the temperature of the iodate solution can vary widely. For example, temperatures of about 10 to 70° C. are useful. A preferred temperature range is 20 to 40° C.

Instead of using a single pass of the acidified aqueous iodate solution through the resin it is preferred that a quantity of the iodate solution containing sufficient iodate anion to oxidize substantially all of the iodide to iodine be continuously recirculated through the resin until the iodide is oxidized to iodine. This assures more complete utilization of the iodate anions. The quantity of recirculating iodate solution is not critical as long as it contains sufficient iodate anions to accomplish the oxidation. The volume should be in excess of one bed volume so that it can be recirculated. One bed volume is the volume of the anion exchange resin being used. Preferably about 2–10 bed volumes, and more preferably 3–5 bed volumes, of acidified aqueous iodate solution containing sufficient iodate to oxidize substantially all of the iodide on the resin to iodine is recirculated in each oxidation.

After the oxidation of iodide to iodine, the iodine is retained on the resin and the resin anion then corresponds mostly with the anion of the acid used to acidify the iodate salt solution. For example, if HCl is used to acidify the iodate salt solution the retained resin anion will be chloride. Further quantities of iodide-containing brine are then passed through the resin to again exchange iodide for the resin anion. The iodide-containing resin is then again oxidized using acidified aqueous iodate solution in the same manner described above. This cycle is repeated until the resin becomes iodine-loaded. In other words, the anion exchange-iodate oxidation cycle is repeated until the resin's ability to retain iodine values drops, as shown by iodine values leaking through the resin during either iodide exchange or iodate oxidation. In practice, about 20–40 cycles have been required to reach the resin saturation point.

Following this, iodine is then recovered from the resin by conventional methods. A satisfactory method of recovering iodine from the loaded resin is by elution with aqueous NaOH. Such methods are known. For example, aqueous caustic containing about 5–10 weight percent NaOH can be passed through the loaded resin until substantially all of the resin iodine is eluted. The elution rate is not critical. Elution can be accomplished at caustic flow rates of about 0.2 to 20 gal/min/ft$^2$. A preferred flow rate is 1 to 6 gal/min/ft$^2$.

The temperature of the caustic eluant can vary widely so long as it is not so high that it damages the resin. Good results can be obtained using aqueous caustic eluant at 10°–70° C., and especially at 30°–50° C.

The amount of aqueous caustic used should be that which is required to remove most of the iodine from the resin. This is generally accomplished by passing about 5–20 bed volumes of caustic through the resin.

A highly preferred method of conducting the elution is by a caustic recirculation method, as described in application Ser. No. 478,647, filed June 12, 1974. According to this highly preferred method, a quantity of aqueous caustic is continuously recirculated through the iodine-loaded resin until the iodide content in the recirculating eluate is maximized. Following this, a second quantity of aqueous caustic can be continuously recirculated through the resin in the same manner until its iodide content is maximized. Further quantities of aqueous caustic can be used in the same manner, but they are generally not required. This highly preferred elution method allows the use of substantially lower quantities of caustic to elute a given quantity of iodine.

In this preferred method the aqueous caustic is of about the same concentration as conventionally used. Best results are obtained with about 5-10 weight percent aqueous caustic at 20°-60° C., and more preferably 30°-50° C. The amount of aqueous caustic in each of the "quantities" is about 1.5-10 bed volumes, and more preferably 3-5 bed volumes.

Caustic elution removes iodine from the resin but very little iodide. This iodide can be left on the resin and subsequently oxidized to iodine with acidified aqueous iodate solution as previously described, or it can be removed by passing aqueous NaCl eluant through the resin. Using 5 to 15 weight percent aqueous NaCl, the residual iodide can be recovered by passing about 2 to 10 bed volumes of the aqueous NaCl through the resin. The resin is then ready for re-use to adsorb iodide from fresh brine.

Iodine can be recovered from the aqueous caustic and NaCl eluate by combining them and acidifying the mixture with HCl to a pH of about 2-3 and then chlorinating to oxidize iodide to iodine. The iodine precipitates and can be recovered by filtration.

In a most preferred method of carrying out the improved process the acidified aqueous iodate solution used to oxidize the iodide to iodine on the resin is obtained by isolating the initial portion of aqueous NaOH eluate and passing chlorine into it without acidifying, which oxidizes the iodide to iodate. The amount of initial caustic eluant set aside is preferably an amount which contains sufficient iodine values in the form of iodide and iodate which when oxidized to iodate is a sufficient amount of iodate to oxidize adsorbed iodide to iodine during all the oxidation cycles required to iodine load the next resin bed. An amount of about 0.5-2 bed volumes has been found to be adequate.

Preferably, the initial portion of eluate is first diluted with 2-3 volumes of water prior to injecting chlorine. Following this, the aqueous iodate solution is acidified as previously described with a strong mineral acid in an amount adequate to provide at least 6 protons per iodate anion and to lower the pH to a range of about 1.0-4.

The manner in which the improved process is carried out is readily seen from the following examples.

EXAMPLE 1

Underground brine containing about 300 ppm of iodide was filtered to remove particulate impurities. An 80 bed volume quantity of the filtered brine was passed through a column (1 cm dia × 84 cm long) containing a strongly basic quaternary ammonium anion exchange resin (Amberlite 400). The rate of brine feed through the resin was 6 gal/min/ft$^2$. After 4 hours the resin was saturated with iodide (1.52 pounds iodide/ft$^3$ resin).

In oxidizing the initial resin bed, 5 bed volumes of an aqueous solution containing 7 weight percent sodium iodate and 8 weight percent HCl was prepared. Then 0.12 bed volumes of this solution was diluted with 4 bed volumes of water to obtain an oxidant solution containing 0.2 weight percent NaIO$_3$ and 0.25 weight percent HCl.

The resultant 4.12 bed volume quantity of acidified aqueous NaIO$_3$ solution was continuously recirculated through the resin bed at a rate of 1 gal/min/ft$^2$ for one hour. This oxidized the adsorbed iodide to iodine.

Following this, an additional 80 bed volume of filtered brine was passed through the column as before at 6 gal/min/ft$^2$ to again saturate the resin with iodide. The iodide-saturated resin was again oxidized by recirculating 4.12 bed volumes of acidified aqueous NaIO$_3$ solution prepared as above.

The cycle of ion exchange followed by oxidation using acidified aqueous NaIO$_3$ solution was repeated 25 times, resulting in an iodine-loaded resin containing 45 pounds of iodine/ft$^3$.

Iodine was eluted from the resin by the recirculation technique. Initially, 4 bed volumes of 7 percent aqueous NaOH was continuously recirculated through the iodine-loaded resin for 1.5 hours at 6/gal/min/ft$^2$ and 50° C. At this time, the iodide content of the recirculating eluate had plateaued. (n.b., A 1.3 bed volume portion of this first quantity of aqueous NaOH eluate was isolated for use in preparing NaIO$_3$ stock solution for use in Example 2.) A second 4 bed volume of 7 percent aqueous NaOH was recirculated through the resin bed for 1.5 hours at 6 gal/min/ft$^2$ and 50° C., as before. The two caustic eluates were kept separate.

Following the caustic elution the resin still contained residual iodide. This was eluted using two 6 bed volume portions of 10 percent aqueous NaCl which were each passed through the resin bed at 1 gal/min/ft$^2$ and 50° C. These two portions of aqueous NaCl eluate were also kept separate.

The first quantity of aqueous NaOH eluate (less the 1.3 bed volume isolated portion) and the first quantity of aqueous NaCl eluate were combined and acidified with HCl to a pH of 2.5. The solution was then chlorinated to a potential of 0.54 volts (Pt/calomel electrodes) causing iodine crystals to precipitate. These were recovered by filtration and purified by melting in concentrated H$_2$SO$_4$ at 113°-115° C. Upon cooling, iodine chunks were recovered analyzing 99.5 percent iodine.

The second quantity of aqueous NaOH eluate and the second quantity of aqueous NaCl eluate were carried over for use as eluants in the next procedure shown in Example 2.

EXAMPLE 2

The eluted resin column from Example 1 was again subjected to repeated cycles of brine circulation followed by oxidation of adsorbed iodide to iodine on the resin using acidified aqueous NaIO$_3$ solution. This example was carried out similar to Example 1 except that the aqueous NaIO$_3$ was prepared from the 1.3 bed volume of the first quantity of aqueous NaOH eluate which was isolated in Example 1. This was diluted with 3.7 bed volumes of water and then chlorinated to oxidize all iodide to iodate (appx. 7 weight percent NaIO$_3$). The solution was then acidified with HCl to neutralize caustic and provide about 8 weight percent HCl. This stock solution was used to prepare the individual oxidizing solutions used in each of the repeating anion exchange-oxidation cycles.

A 0.12 bed volume portion of the NaIO$_3$ stock solution was diluted with 4 bed volumes of water to give an oxidizing solution of 0.2 weight percent NaIO$_3$ and 0.25 weight percent HCl. Following each cycle of adsorption of iodide anion from the filtered brine the adsorbed iodide was oxidized to iodine on the resin by recirculating a 4.12 bed volume acidified aqueous NaIO$_3$ solution through the resin in the same manner as in Example 1.

After 25 anion exchange-oxidation cycles the resin was iodine-loaded. The caustic elution step was modified by using the second 4 bed volume quantity of caustic eluate from Example 1 as the first quantity of caustic eluant in this example. The caustic was continuously recirculated through the iodine-loaded resin for 1.5 hours at 6 gal/min/ft$^2$ and 50° C. as in Example 1. As in Example 1, a 1.3 bed volume portion of the resultant first caustic eluate was isolated for use in preparing the acidified NaIO$_3$ stock solution for use in the next series of iodide adsorption-oxidation cycles.

The resin was then eluted with a freshly prepared second 4 bed volume quantity of 7 percent aqueous NaOH following the continuous recirculation technique. This second caustic eluate was then isolated for use as the first caustic eluant in the next iodine recovery procedure.

The resin was then eluted with the second 6 bed volume quantity of aqueous NaCl solution carried over from Example 1. Following this, the resin was eluted with a freshly prepared second 6 bed volume quantity of 10 percent aqueous NaCl. This second NaCl eluate was isolated for use as the first aqueous NaCl eluant in the next iodine recovery procedure.

The above cascading procedure can be used through a great number of iodine recovery processes. If the amount of acidified NaIO$_3$ stock solution prepared in each procedure is more than is required in the next procedure then the amount of the first caustic eluate that is isolated in the next procedure can be lowered to adjust for this. Likewise, if it is not a sufficient amount to carry out each of the repeating oxidation cycles in the next procedure the amount isolated should be increased.

In a preferred mode of operation the spent iodate solution after recirculation through the resin to oxidize iodide to iodine is not discarded but is merely spiked with the iodate stock solution to form an oxidant solution for use in the next iodide oxidation. In other words, in Example 1, the 4 bed volumes of water to which the 0.12 bed volume portion of NaIO$_3$ stock solution was added can be the spent iodate solution from the previous iodate resin oxidation. Since the spent iodate solution will still contain some acid, the amount of acid used to acidify the chlorinated initial portion of caustic eluate can be reduced to keep the total acid at the preferred level.

We claim:

1. In a process for recovering iodine from brine containing recoverable amounts of iodide, said process comprising repeating cycles of
    (1) passing said brine without acidification or oxidation through a basic anion exchange resin to adsorb iodide ion, and
    (2) oxidizing adsorbed iodide to adsorbed iodine, said cycles being repeated until said resin becomes substantially loaded with iodine and then recovering said iodine from said resin, the improvement wherein said oxidizing is conducted by passing a separately prepared acidified aqueous iodate oxidizing solution through said resin to convert adsorbed iodide to adsorbed iodine.

2. An improved process of claim 1 wherein said aqueous iodate solution is a sodium iodate solution.

3. An improved process of claim 2 wherein the acid used to acidify said aqueous sodium iodate is HCl in amounts such that the pH of said aqueous sodium iodate solution is lowered to about 1.0–4.0.

4. An improved process of claim 3 wherein said aqueous iodate solution contains about 0.02 to about 10 weight percent sodium iodate.

5. An improved process of claim 4 wherein said acidified aqueous sodium iodate solution contains at least about 1.1 part by weight HCl per each part by weight sodium iodate.

6. An improved process of claim 1 wherein said aqueous iodate oxidizing solution is obtained by
    (1) eluting said adsorbed iodine from the iodine-loaded resin with aqueous sodium hydroxide,
    (2) isolating the initial portion of eluate,
    (3) passing chlorine into said isolated eluate in an amount sufficient to convert substantially all of the contained iodide to iodate, and
    (4) acidifying the resultant sodium iodate solution with HCl to a pH of about 1.0–4 to form said oxidizing solution.

7. An improved process of claim 6 wherein said oxidizing is conducted by continuously recirculating a quantity of said acidified sodium iodate oxidizing solution through said resin until said adsorbed iodide is oxidized to iodine, said quantity containing sufficient iodate to oxidize said adsorbed iodide to iodine.

* * * * *